United States Patent Office 2,757,377
Patented July 31, 1956

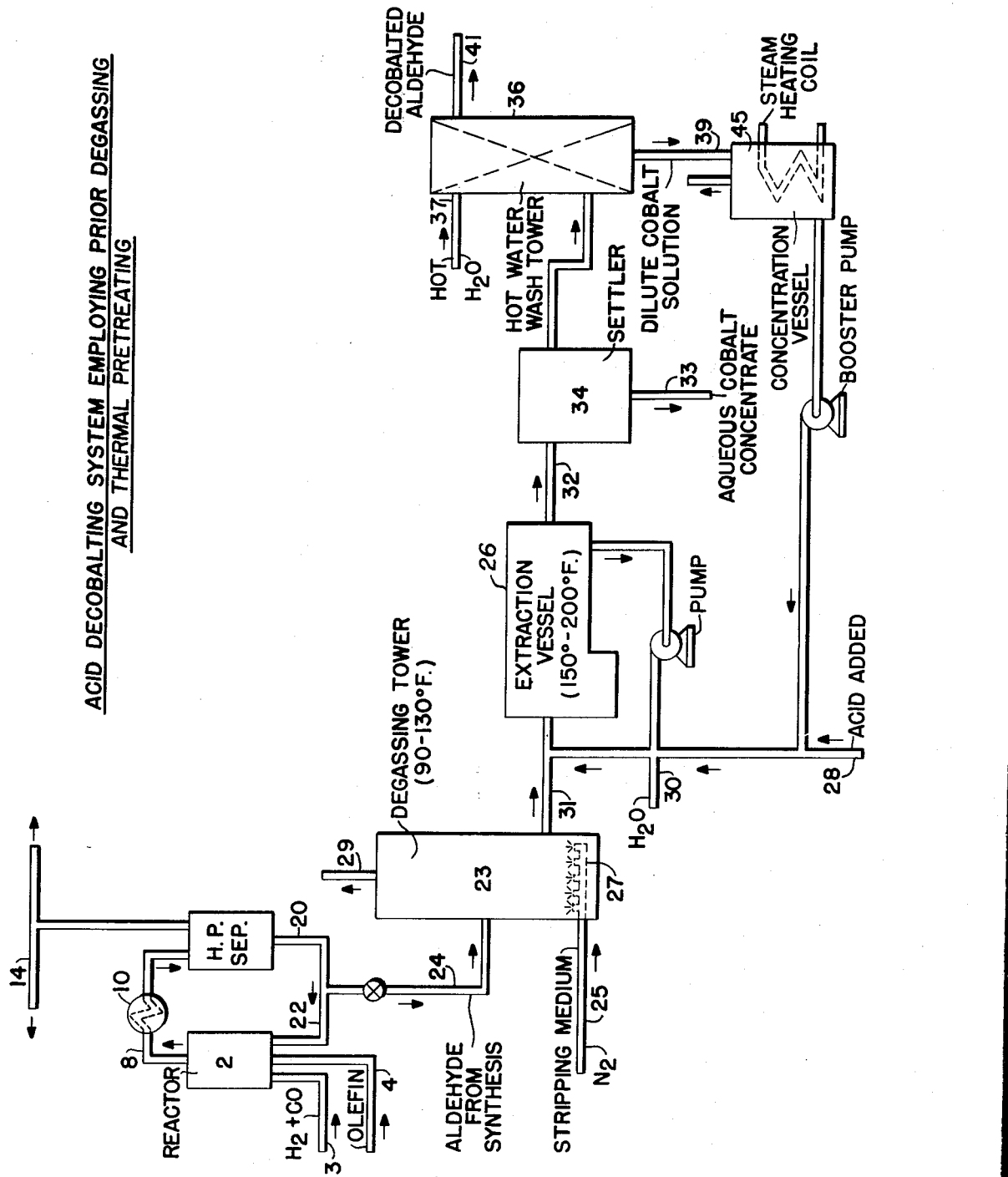

2,757,377
ACID DECOBALTING

Joseph K. Mertzweiller and Fred J. Buchmann, Baton Rouge, La., assignors to Esso Research and Engineering Company, a corporation of Delaware Application March 2, 1953, Serial No. 339,716

7 Claims. (Cl. 260—604)

The present invention relates to the preparation of organic compounds by the reaction of carbon monoxide and hydrogen with carbon compounds containing olefinic linkages in the presence of a carbonylation catalyst. More specifically, the present invention relates to the removal and recovery of the cobalt catalyst utilized in the foregoing reaction from the product of the first stage of the cobalt carbonylation reaction for further use in the process.

It is now well known in the art that oxygenated organic compounds may be synthesized from organic compounds containing olefinic linkages by a reaction with carbon monoxide and hydrogen in the presence of a catalyst containing metal of the iron group, such as cobalt, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it, salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefinis, but most organic compounds possessing at least one non-aromatic carbon-carbon double bond may be reacted by this method. This, straight and branch-chained olefins and diolefins, such as propylene, butylene, pentene, hexene, heptene, butadiene, pentadiene, styrene, olefin polymers, such as di- and tri-isobutylene and hexene and heptene dimers, polypropylene, olefinic fractions from the hydrocarbon synthesis process, thermal or catalytic cracking operations, and other sources of hydrocarbon fractions containing olefins, may be used as starting material, depending upon the nature of the final product desired.

The catalyst in the fist stage of the prior art processes is usually added in the form of salts of the catalytically active metal with high molecular fatty acids, such as stearic, oleic, palmitic, naphthenic, etc., acids. Thus, suitable catalysts are, for example, cobalt oleate or naphthenate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g., and at temperatures in the range of about 150°–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture, and it is to this stage that the present principal invention applies.

From the catalyst removal zone, the reaction products, comprising essentially aldehydes, may be transferred to a hydrogenation zone, and the products reduced to the corresponding alcohols in a manner known per se.

One of the problems involved in the aldehyde synthesis reaction is the fact that the catalyst metal, such as cobalt, though added as an organic salt, reacts with carbon monoxide under the synthesis conditions to form the metal carbonyl. There is basis for the belief that the metal carbonyl itself is the active form of the catalyst. This dissolved catalyst must be removed prior to the subsequent hydrogenation, as otherwise it would separate out on the hydrogenation catalyst, plug transfer lines and heat exchanges, etc. The carbonyl remains dissolved in the reaction product from the primary carbonylation stage and is, therefore, removed in the catalyst removal or decobalting zone.

A way to remove the cobalt is by a thermal method, wherein the accrued product, comprising aldehydes containing substantial amounts of dissolved cobalt as carbonyl and also oil-soluble salts and complexes and compounds, is treated, preferably in the presence of a stripping gas, at temperatures of about 300°–350° F. Heat may be supplied by a coil or other heat transfer surface immersed in the liquid. The purpose of the inert stripping gas, such as hydrogen, is to decrease the CO partial pressure by removing CO as soon as formed by decomposition of the carbonyl, thus pushing the equilibrium reaction forward.

This process, however, has been far from satisfactory. Periodically it has been necessary to take the decobalter off stream to remove accumulated metallic cobalt, to prevent plugging of feed lines and heat transfer surfaces, upon which cobalt metal deposits as a hard film. The removal of these films and deposited cobalt metal is a tedious and difficult process, and adds significant cost to the economics of the carbonylation reaction. Furthermore, thermal decobalting usually did not completely remove soluble cobalt from the aldehyde product, for though cobalt carbonyl was generally decomposed, other cobalt compounds present in the first stage aldehyde product, which may have arisen from secondary reactions in the Oxo stage, such as formic acid formation, were not decomposed under the thermal treating conditions.

These difficulties were to a great extent removed, and a long step forward taken, when it was found that when the contaminated aldehyde product from the Oxo stage was treated with dilute aqueous solutions of organic acids whose cobalt salts are water-soluble and oil-insoluble, efficient decobalting was obtained with residual cobalt content of the aldehyde product less than 10–50 parts per million.

Thermal decobalting had frequently given an aldehyde product with soluble cobalt content of 100–500 parts per million.

An important advantage of the acid decobalting operation, besides the fact that lower temperatures are required than in thermal decobalting, is that cobalt recovery is considerably simplified and made more feasible. Because of the strategic importance of this metal, it is essential for an economic operation that substantially all of the metal be recovered and reutilized. This is practically impossible in purely thermal processes, for the metal and solid is precipitated on packing, reactor walls and heat transfer surfaces, and forms hard films, necessitating removal of the unit and drilling, etc., as well as cumbersome filtration operations. The effect of dilute aqueous organic acid injection, however, is to convert substantially all the cobalt dissolved in the aldehyde product, regardless in what form it is present, into a water-soluble salt, and this aqueous stream is readily separated from the decobalted aldehyde product.

The utilization of this aqueous cobalt stream, however, which may have a cobalt concentration of from 0.5 to 10%, poses several real problems. The most direct method of utilization would be recycling directly the aqueous stream to the primary aldehyde synthesis zone. This step, however, has the drawback that it involves recycling substantial quantities of water to the aldehyde snythesis reaction zone. Though relatively small amounts of water have been found useful in increasing selectivity to aldehydes, larger amounts have been found to cause reactor oven flooding and consequent stratification and quenching of the reaction. Flooding is particularly liable to occur if the cobalt solution recovered from the acid decobalter is relatively dilute. The limitation of concentration is given by the solubility of cobalt acetate in water, which is about 7.5% by weight (as cobalt).

A desirable method of recovering the cobalt from the aqueous solution would be to convert the salt into the form in which it was initially introduced into the carbonylation reactor, i. e., into the oil-soluble, high molecular weight fatty acid soap, such as cobalt oleate, naphthenate, and the like. This insures a homogeneous reaction mixture in the initial reaction zone as well as avoiding introduction of extraneous reactants such as water. However, when it was attempted to convert the water-soluble cobalt salt, which was assumed to be cobalt acetate (when acetic acid is used as the decobalting agent) into the corresponding cobalt oleate by heating in the presence of oleic acid and NaOH, a surprising result was observed. Only a portion of the total cobalt dissolved in the aqueous solution could be converted into cobalt oleate, in accordance with the reaction $$2RCOOH + 2NaOH + Co^{++} \rightarrow Co(O_2CR)_2 + 2Na^+ + 2H_2O$$

Analysis of the reaction products after the cobalt oleate was formed in accordance with the above reaction indicated that a substantial portion of cobalt was still in the water layer, even though an amount of acid in excess of that required to react with the cobalt was added.

It is evident, therefore, that a significant portion of the cobalt present in the water solution resulting from acid decobalting is not in a form available for reaction with an organic acid or an alkali, and hence cannot be converted by conventional processes into oil-soluble cobalt soaps.

The surprising fact was found that the acid treatment of the aldehyde does not convert the carbonyl dissolved therein completely, or even substantially, into cobalt acetate, when the aldehyde product produced in the Oxo state is treated at temperatures less than 200° F. (to prevent thermal decomposition to cobalt metal) with dilute acetic acid. Instead of the expected hydrolytic reaction of cobalt carbonyl and other forms of cobalt compounds with hot dilute acetic acid to form cobalt acetate, it was discovered that a substantial proportion of the cobalt in the water layer was present as the anion rather than as the cobaltous cation. Analysis of the water layer following acid decobalting has shown that 30–50% of the total cobalt was present as the anion $Co(CO)_4^-$ and the corresponding salt $Co(Co(CO)_4)_2$. From this it is readily seen that when this aqueous solution is treated with oleic acid and caustic to convert the "cobalt acetate" to cobalt oleate, the cobalt present as $Co(CO)_4^-$ is not available for conversion to the fatty acid salt. It is probable that the cobalt salt $$Co(Co(CO)_4)_2$$

is formed by extraction of aldehyde containing free cobalt hydrocarbonyl, $HCo(CO)_4$, with aqueous solution of cobalt acetate initially formed.

It is, therefore, the principal purpose and object of the present invention to prevent formation of anionic cobalt in the acid decobalting operation and to recover from the acid decobalting step an aqueous product wherein the cobalt is present substantially completely as the cobaltous ion.

It is also a purpose of the present invention to provide an improved means for removing and recovering cobalt from the conversion products resulting from the reaction of olefins, CO and $H_2$.

It is still a further object of the present invention to provide a process for decobalting aldehydes wherein the decobalted product is substantially completely and consistently free from residual cobalt.

Other and further purposes, objects, and advantages of the present invention will become apparent from the more detailed description hereinafter.

It has now been found that the presence of anionic cobalt in the water extract resulting from dilute acid decobalting can be substantially completely eliminated if the aldehyde feed to the decobalting, or catalyst removal operation, is subjected to a thermal pretreating operation and freed from dissolved $H_2$ and CO prior to the acid decobalting operation. This may be advantageously carried out by purging or stripping with an inert gas prior to decobalting, under conditions wherein cobalt carbonyl is not substantially decomposed. Thus low temperatures of about 100° to 130° F. may be employed. Decomposition of cobalt carbonyl is to be avoided, for this causes precipitation of metallic cobalt, which is difficult to recover.

The process of the present invention is to be distinguished from prior art thermal decobalting, wherein an inert gas, such as hydrogen, is introduced into the reactor during the decobalting operation. Such process is fraught with difficulties enumerated previously. In accordance with the present invention, merely dissolved $H_2$ and CO are removed. The decobalting operation proper is carried out by the dilute acid technique, and it was discovered that the aqueous layer following the treatment of the aldehyde product was completely free of anionic cobalt. The cobalt dissolved in the aqueous phase was present completely as the cobaltous ion, and thus could readily be converted into the corresponding cobalt soap by known means.

The present invention will best be understood from the more detailed description hereinafter, wherein reference will be made to the accompanying drawing, which is a schematic representation of a system suitable for carrying out a preferred embodiment of the invention.

Turning now to the figure, olefin feed is passed after preheating in a fired coil (not shown) through feed line 4 to the bottom portion of primary reactor 2. The latter comprises a reaction vessel which may, if desired, be packed with non-catalytic material, such as Raschig rings, pumice, and the like, and may be divided into discrete packed zones.

Catalyst may be injected as an oil-soluble cobalt soap, such as cobalt oleate or naphthenate, or the like, along with the olefin, in amounts equivalent to about 0.1–0.5% of cobalt on olefin.

A gas mixture comprising preferably approximately equal volume of $H_2$ and CO is supplied through line 3 to primary reactor 2 and flows concurrently with the olefin feed. Reactor 2 is preferably operated at a pressure of about 2500–3500 p. s. i. g. and at a temperature of about 200°–450° F., depending upon the olefin feed and other reaction conditions.

Liquid oxygenated reaction product containing catalyst in solution and unreacted synthesis gas, is withdrawn overhead from an upper portion of reactor 2, and transferred through line 8 and cooler 10 to high pressure separator 12, which is maintained at pressures of about the same order of magnitude as reactor 2, and wherein a portion of the unreacted $H_2$ and CO are withdrawn overhead through line 14, and preferably, at least in part, recycled.

A stream of primary reaction product containing dissolved therein relatively high concentration of cobalt carbonyl and other forms of cobalt as well as residual $H_2$ and CO is withdrawn from separator 12 through line 20. A portion of this stream may be recycled to reactor 2, via line 22 to aid in cooling and maintenance of temperature control of the primary carbonylation stage. The balance of the primary reaction product is now passed via line 24 in accordance with the present invention, to the pretreating and degassing zone 23.

Zone 23 is preferably a tower which may, if desired, be packed to provide a high surface area. Aldehyde product is introduced at an intermediate point in the tower and passes downwardly. An inert stripping gas, such as nitrogen, methane, natural gas, hydrogen, and the like, is introduced into the lower portion of 23 through line 25 and distributor 27. Conditions in tower 23 include temperatures of about 90°–130° F. and pressures of atmospheric to 150 p. s. i. g.

The exact function of the thermal pretreating and degassing operation is not completely understood, and the scope of the invention is not limited to any particular mechanism. In the subsequently described acid decobalting operation in which the present invention regarding thermal pretreatment is not employed, the aqueous cobalt concentrate contains 30–50% of the cobalt as the carbonyl anion, $Co(CO)_4^-$. This is believed to result from initial formation of some $Co^{++}$ which then extracts the carbonyl anion from the organic phase because of the following solubility relationships:

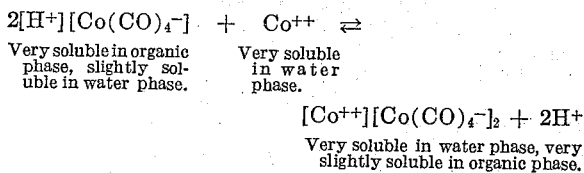

$$2[H^+][Co(CO)_4^-] + Co^{++} \rightleftharpoons [Co^{++}][Co(CO)_4^-]_2 + 2H^+$$

Very soluble in water phase, very slightly soluble in organic phase.

The salt $Co[Co(CO)_4]_2$ is thermally stable under the acid decobalting conditions in the absence of air or oxidizing agents.

The thermal pretreatment and degassing is considered to achieve substantially complete conversion of cobalt hydrocarbonyl to cobalt carbonyl, but essentially no conversion of cobalt carbonyl to metallic cobalt. Thus no actual decobalting is accomplished in the pretreating operation in which the temperatures do not substantially exceed the initial decomposition temperature of cobalt carbonyl (125° F.). It is then possible to achieve substantially complete cobalt removal in the subsequent treatment with an aqueous acid solution at temperatures in the range of 150°–200° F., the aqueous cobalt concentrate from which contains practically no anionic cobalt. It is very important that little or no decomposition of cobalt carbonyl take place in the thermal pretreating operation, since metallic cobalt does not readily react with the aqueous acetic acid and the advantage of recovering all of the cobalt in soluble form would be lost. In this sense the invention is actually a two-stage decobalting process, the first stage functioning to decompose cobalt hydrocarbonyl and the second to decompose the resulting cobalt carbonyl in the presence of an aqueous acid solution to give the cobalt salt of the acid. Purge gases are removed overhead through line 29.

The aldehyde product, now completely degassed but containing in solution up to 2000 parts per million of cobalt, is passed via line 31 to extraction vessel 26.

This unit is of any conventional design and is adapted to mix thoroughly an aqueous and a water-insoluble liquid organic phase. Water is injected through line 30, and an organic acid of low molecular weight, such as acetic, formic, and the like, is added through line 28. About 5 to 15% (based on aldehyde) of a 10% aqueous solution of acetic acid may be employed.

The temperature level within mixer 26 must be carefully controlled. High temperatures speed the reaction rate, but too high temperatures result in thermal decomposition of cobalt carbonyl to metallic cobalt, which is difficultly soluble in the dilute acid mixture, and this is undesirable. The temperature within mixing zone 26 is preferably maintained at about 150°–185° F., and should not exceed about 200° F.

After a sufficient period of mixing, about 30 to 120 minutes, the mixture is passed through line 32 to settler 34, where the aqueous and aldehyde layers are allowed to stratify. The upper aldehyde layer may then be passed to water washer 36, where hot water, at about 150°–170° F., may be injected through line 37, to wash out the last traces of cobalt and acid. About 10–100% water may be used, and the wash water, withdrawn through line 39, may advantageously be concentrated in concentrator 45, and employed as the diluent for the organic acid used as the decobalting medium.

Overhead from 36, there is withdrawn through line 41 the substantially completely decobalted aldehyde product which may be passed to storage for subsequent conversion into alcohols in a manner known per se.

The lower aqueous layer withdrawn from settler 34 through line 33, wherein all the cobalt is present substantially completely as cobaltous ion, may now be converted to the corresponding cobalt soap for further use in the process. A good method of conversion is to treat the aqueous cobalt solution with oleic acid dissolved in the olefin to be oxonated, in the presence of NaOH. This will provide the cobalt oleate dissolved in a portion of the olefin feed, which may then be passed to the carbonylation vessel 2.

The invention admits of numerous modifications apparent to those skilled in the art.

The invention may be further illustrated by the following specific example embodying the inventive concept of thermal treating prior to acid decobalting. Thus in the following table are shown the results of a series of batch tests illustrating the effect of CO and $H_2$ partial pressure on acid decobalting, and the effect of degassing in improving the acid decobalting and preventing formation of anionic cobalt is clearly shown.

TABLE

| Run No | A | B | C |
|---|---|---|---|
| Synthesis | 500 cc. of $C_7$ olefin containing 0.2 wt. percent cobalt as cobalt oleate treated with CO and $H_2$ at 2,000–2,900 p. s. i. g. and 300°–325° F. until gas absorption was complete. Operation carried out in shaker autoclave. | | |
| Purge Conditions Method | Autoclave pressured to about 2,000 p. s. i. g. with purge medium, shaken five minutes, then depressured. | | |
| Number of Purges | 3 | 3 | None |
| Purge Temp., °F | 125 | 90 | |
| Medium | Nitrogen | Nitrogen | |
| Decobalting | Products shaken in autoclave with 10% (on olefin feed) of 5% acetic acid at 170° F. for 2 hours. Discharged, aldehyde and aqueous layers separated and analyzed. | | |
| Pressure, p. s. i. g. During Decobalting | 100 | 175 | 100 |
| Aldehyde Product, Cobalt, Wt. Percent | 0.0021 | 0.0054 | 0.025 |
| After Hot Water Wash, Cobalt, Wt. Percent | | | 0.0008 |
| Aqueous layer: | | | |
| Cation Cobalt, Wt. Percent | 1.34 | 1.03 | 0.78 |
| Anion Cobalt, Wt. Percent | 0.0 | 0.49 | 0.52 |
| Percent of Cobalt in Water in Anion Form | 0 | 32 | 40 |
| Total Cobalt Recovery, Percent | 98 | 99 | 101 |

In run A the product thermally treated and degassed by three successive nitrogen purges at 125° F. and the system pressure of 100 p. s. i. g. under decobalting conditions is considered to represent essentially no hydrogen or carbon monoxide partial pressure. The aqueous layer from this decobalting operation contained no detectable anionic cobalt. This is directly comparable to run C in which no pretreatment was employed, and the decobalting pressure of 100 p. s. i. g. was almost entirely carbon monoxide and hydrogen pressure. In this case, 40% of the cobalt in the aqueous phase was present as the anion. The conditions of run B are intermediate, being representative of incomplete degassing at a purging temperature of about 90° F.

The degree of decobalting of the aldehyde product is also noteworthy. With the preliminary degassing technique of the present invention, the amount of cobalt in the aldehyde product was 0.0021%; less than one-tenth that obtained without the preliminary degassing procedure. A single water wash would be satisfactory to remove the last traces of cobalt. It is also significant that the cobalt recovered in solution in the aqueous phase amounts to substantially all of the cobalt originally charged. This indicates that little or no thermal decobalting took place during the pretreating operation, since any metallic cobalt formed would not readily dissolve in the aqueous acetic acid. It has been established that cobalt metal from decomposition of cobalt carbonyl dissolves in aqueous acetic acid at an extremely low rate and if such a reaction occurred during the pretreating operation the cobalt recovery in solution would have been proportionately decreased.

Example I

A feed was prepared by blending cobalt oleate with a $C_7$ fraction of propylene-butylene polymer to give a cobalt concentration of 0.212 weight per cent. A weight of 527 grams of this feed was charged to a shaker autoclave and treated with hydrogen and carbon monoxide (about 1.1/1 ratio) at a temperature of 300°–375° F. and pressures of 2000–2800 p. s. i. g. until gas absorption was substantially complete. After cooling, depressuring, and withdrawing a small sample, the autoclave was purged with synthesis gas and heated to 120°–125° F. and subjected to three successive nitrogen purges by pressuring to 2000 p. s. i. g., shaking for five minutes, and depressuring. The autoclave was cooled and a small sample removed. The remainder of the product was decobalted by adding 60 cc. of 5% acetic acid aqueous solution, and heating to 160°–170° F. in a nitrogen atmosphere for two hours. The product was separated and the aqueous layer analyzed for anionic and cationic cobalt by potentiometric titration. The distribution of cobalt in the products from the various treatments is shown in the following table:

| Sample | Cobalt, Wt. Percent | Cobalt, Grams | Percent of Cobalt Charged |
|---|---|---|---|
| Feed to oxonation | 0.212 | 1.12 | 100 |
| Oxo product | [1] 0.172 | 1.09 | 97 |
| Product after three nitrogen purges (thermal degassing) | 0.160 | 1.02 | 91 |
| Decobalted product | 0.009 | 0.05 | 5 |
| Aqueous layer from decobalting | | 0.96 | 86 |

[1] Total weight of Oxo product obtained from 527 grams of feed was 633 grams.

The above data illustrate the principal features of the invention. The Oxo product contained substantially all (97%) of the cobalt charged. After the thermal degassing treatment, which is the essential part of the invention, there was only a very slight decrease in the dissolved cobalt. This indicates that little or no decobalting is achieved under the conditions of the treatment. Subsequent decobalting by extraction with aqueous acetic acid removed 86% of the initial charge of cobalt in the aqueous layer and left 5% in the aldehyde product. The aldehyde can be substantially freed of this residual cobalt by means of a water wash as indicated in a previous example. Analysis showed the aqueous layer from the decobalting operation to contain 0.96 gram of cobalt, or 86% of the original charge. Of this amount, 0.93 gram, or 97% of the total, was present as the cobaltous cation.

What is claimed is:

1. In a carbonylation process wherein carbon compounds containing olefinic linkages are reacted with CO, $H_2$, and a cobalt carbonylation catalyst at elevated temperatures and pressures in a carbonylation zone to form reaction products comprising aldehydes containing at least one more carbon atom than said carbon compounds, and wherein a solution comprising said reaction products and dissolved cobalt is transferred to a catalyst removal zone and said cobalt is removed from said aldehyde product, an improved method of removing and recovering said cobalt from said aldehyde product which comprises withdrawing from said carbonylation zone an aldehyde product contaminated with carbonyls and hydrocarbonyl of cobalt and containing in solution hydrogen and carbon monoxide, passing said solution to a degassing zone, subjecting said withdrawn product to a thermal treatment in the presence of an inert gas at a temperature no greater than about 130° F. whereby said dissolved hydrogen and carbon monoxide are substantially completely removed from solution but no significant amount of cobalt carbonyl is decomposed to metallic cobalt, passing said degassed aldehyde product to a decobalting zone, contacting said cobalt-contaminated aldehyde product with an aqueous solution of an organic acid whose cobalt salts are water-soluble and oil-soluble, converting said cobalt compounds dissolved in said aldehyde product into water-soluble forms of cobalt, recovering a substantially completely cobalt-free aldehyde product, and recovering an aqueous solution of cobalt wherein cobalt is present substantially completely as cobaltous ion.

2. In a carbonylation reaction wherein carbon compounds containing olefinic linkages are reacted with $H_2$ and CO in the presence of a cobalt catalyst at elevated temperatures and pressures in a carbonylation zone to produce an aldehyde product contaminated with hydrocarbonyl and carbonyls of cobalt and wherein said cobalt is removed from solution, the improvement which comprises withdrawing said product and contaminants from said carbonylation zone, subjecting said withdrawn material to a thermal treatment at a temperature no greater than about 130° F. in the presence of an inert gas to convert dissolved cobalt hydrocarbonyl into cobalt carbonyl whereby no substantial decomposition of cobalt carbonyl takes place, and thereafter treating said aldehyde product with an aqueous solution of an organic acid whose cobalt salts are water-soluble and oil-soluble.

3. In a carbonylation reaction wherein olefins, carbon monoxide, and hydrogen are contacted in a carbonylation zone in the presence of a cobalt catalyst under conditions to produce reaction products comprising aldehydes containing at least one more carbon atom than said olefinic compounds, and wherein a solution comprising said reaction products and dissolved cobalt catalyst is transferred to a catalyst removal zone and said cobalt is recovered, the improvement which comprises withdrawing from said carbonylation zone an aldehyde product containing in solution $H_2$, CO, cobalt hydrocarbonyl and cobalt carbonyl, passing said solution to a stripping zone, maintaining in said zone a temperature of from about 90°–130° F. and a pressure of from about 15–150 p. s. i. g., passing an inert gas into said zone, removing $H_2$ and CO from said aldehyde product and converting cobalt hydrocarbonyl into cobalt carbonyl, withdrawing from said zone an aldehyde product containing substantial amounts of cobalt in solution as cobalt carbonyl, passing said degassed aldehyde product to a decobalting zone, passing into said zone a dilute aqueous solution of an organic acid whose cobalt salts are water-soluble and oil-soluble, maintaining a temperature of from about 150°–200° F., in said zone, converting said cobalt carbonyl substantially completely into a water-soluble form of cobalt, withdrawing a cobalt-free aldehyde product and recovering an aqueous solution wherein cobalt is substantially exclusively present as the cobaltous ion.

4. The process of claim 3 wherein said acid is acetic acid.

5. The process of claim 3 wherein said inert gas is nitrogen.

6. The process of claim 3 wherein the amount of cobalt dissolved in aldehyde effluent from said stripping zone is substantially equal to the amount of soluble cobalt in the feed to said zone.

7. The process of claim 3 wherein said cobalt recovered as the cobaltous ion is converted to the corresponding cobalt soap and utilized as catalyst in said carbonylation zone.

References Cited in the file of this patent

FOREIGN PATENTS 496,845     Belgium _____ Jan. 8, 1951